March 24, 1931. E. P. HAMLETT 1,798,084
WEDGE DEVICE SUITABLE FOR USE WITH SHIP'S
HATCH COVERS AND FOR OTHER PURPOSES
Filed Aug. 20, 1930
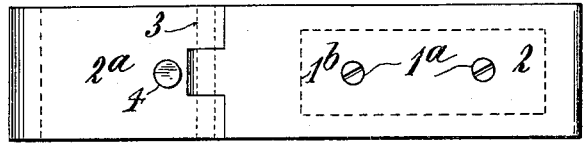
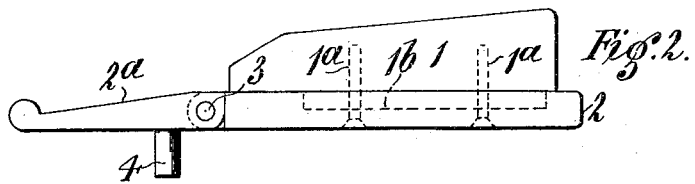
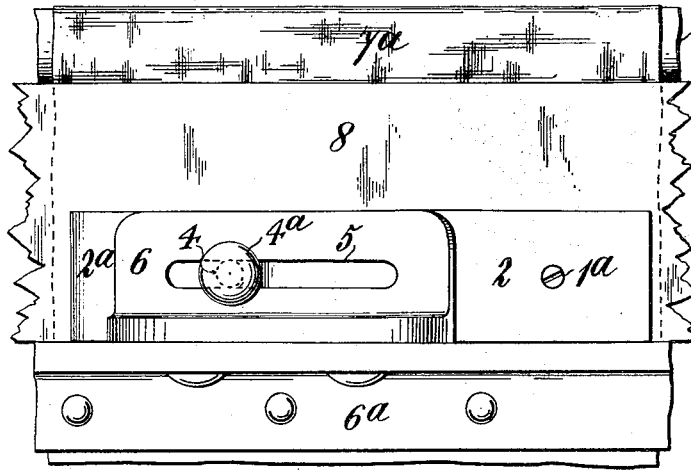
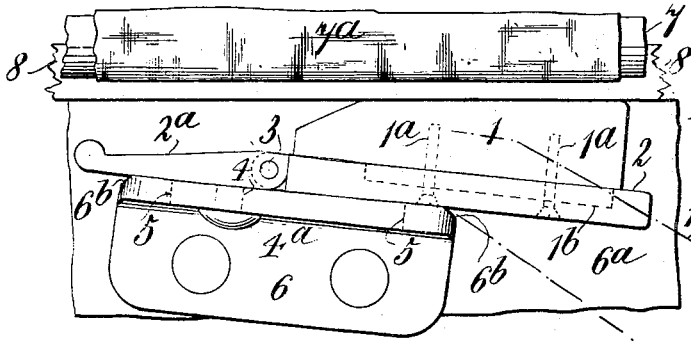
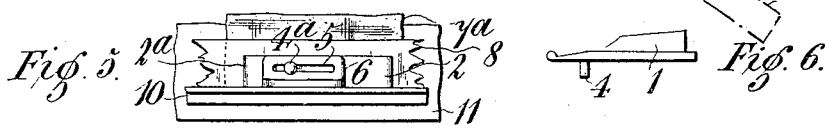
Inventor
Edgar Percy Hamlett
By Dowell & Dowell
Attorneys Patented Mar. 24, 1931

1,798,084

UNITED STATES PATENT OFFICE

EDGAR PERCY HAMLETT, OF CARDIFF, WALES

WEDGE DEVICE SUITABLE FOR USE WITH SHIP'S HATCH COVERS AND FOR OTHER PURPOSES

Application filed August 20, 1930, Serial No. 476,646, and in Great Britain May 30, 1929.

For securing a flexible hatch cover, formed for instance of tarpaulin, over a ship's hatchway, the usual practice is to force wooden wedges between cleats connected to the hatch coaming and battens extending along side and end portions of the cover overhanging the hatch coaming, so that the said overhanging portions of the cover will be forced tightly against the coaming and the cover be thus fixed in the closed position. With this arrangement, the wedges are liable to become disengaged from the cleats and battens by heavy seas and be lost, thereby enabling the hatchway to become uncovered, resulting in damage to the ship's cargo and also endangering the safety of the ship. Furthermore, the wedges sometimes become so firmly fixed in position that when it is desired to remove them, to enable the cover to be removed, it becomes necessary to use a tool, for instance a crow bar, which sometimes damages the cover, which is an expensive article to replace.

Now the present invention has for its object to provide wedge devices adapted to secure and release a ship's hatch cover in a better manner than heretofore, and whereby the above mentioned disadvantages are avoided.

The invention also has for its object to provide a wedge device that can be used for other purposes, as for instance for securing the overhanging portions of a flexible cover to the body of a railway wagon.

A wedge device according to the invention, comprises a wedge of any suitable size and material, for instance an ordinary standard size beechwood wedge, which is secured to a metal shoe adapted, when applied to secure a cover to a hatch coaming of a ship, to be driven endways between a stationary cleat secured to the hatch coaming, at an angle thereto, and a batten bearing against the adjacent lower side portion of a hatch cover to secure the said portion of the cover firmly in position, and to be driven in the opposite direction to release the said portion of the cover. To prevent detachment and loss of the wedge device, the metal shoe is attached to the cleat in such a manner that it is movable longitudinally in relation thereto, to a limited extent, without becoming detached therefrom. For this purpose it may be provided with a laterally extending headed pin or the like arranged to extend through a longitudinal slot formed in the cleat, but not to leave the slot, the slot being closed at its ends and made of such a length as to permit of the required drift of the wedge device to enable the wedge to become clear of the associated batten.

When applying such wedge devices to secure a flexible cover over a railway wagon, the cleats are suitably connected to the body of the wagon.

The shoe may be made in one piece but is preferably made in longitudinal parts joined together in such manner that they can turn relatively to one another about a transverse axis, the wedge being secured to one portion, (hereinafter called for distinction the rearward portion) of the shoe and the other or forward portion of the shoe being connected to the cleat so that it can slide endways thereon to a limited extent but cannot become detached therefrom, the arrangement being such that when the wedge device has been moved back to a limited extent in relation to the cleat and batten, its rearward portion with attached wedge can be moved outward and away from the batten, thus allowing the latter to be removed more easily and quickly than heretofore usual.

In the accompanying illustrative drawings, Figs. 1 and 2 show respectively in side elevation and plan, one construction of wedge device according to the present invention. Figs. 3 and 4 show respectively in side elevation and plan, how the wedge device is combined with a slotted cleat for securing a ship's hatch cover in place. Fig. 5 shows in side elevation how a wedge device and cleat can be applied to hold a wagon cover in place. Fig. 6 shows in plan, a modified construction of wedge device.

In the example shown in Figs. 1 to 4 inclusive, 1 is a wooden wedge secured, as by screws $1^a$, in a recess $1^b$ formed in the rearward portion 2 of a two-part metal shoe the forward portion $2^a$ of which is hinged to the rearward portion 2 by a vertical hinge pin 3. The forward portion 2ª of the shoe, is, as shown in Figs. 3 and 4, provided with a lateral stud 4 arranged to extend through and slide in a longitudinal slot 5 formed in a metal cleat 6, of angle shape, fixed to an angle bar 6ª secured to the coaming 7 of the ship, the vertical side of the cleat being, as usual, inclined longitudinally to the adjacent side of the coaming. The two parts 2 and 2ª of the shoe are preferably made as drop metal forgings. The lateral stud 4 is preferably formed in one piece with the forward part 2ª of the shoe. To prevent the shoe becoming detached from the cleat, the stud 4 is arranged to extend through the slot and its outer end is adapted, as by riveting it over, to form a head 4ª adapted to slide against the outer side of the adjacent vertical portion of the cleat. The cleat 6, except for the slot 5 therein, may be of the usual kind employed on all ships as required by the British Board of Trade. Existing cleats may be adapted for use with wedge devices of the kind described, by forming in each of them a longitudinal slot such as 5.

The arrangement is such that when a flexible hatch cover 7ª is placed as usual over a hatchway with its edge portions brought down over the sides and ends of the hatch coaming 7, battens, one of which is shown at 8, are placed as usual along each of the said edge portions, then, upon driving wedge devices such as described, into positions between the cleats and battens, for instance, by a hand hammer applied to the rearward portions 2 of the shoes, the shoes 2—2ª will bear sideways tightly against the cleats 6, and the wedges 1 will bear tightly against the battens 8 and thereby securely hold the side and end portions of the hatch cover in position. By applying a blow to the forward portion 2ª of each shoe, it can be moved back to such an extent as to enable the rearward portion 2 of the shoe to be turned outwardly, as indicated in dotted lines in Fig. 4, to release the corresponding batten 8 and admit of its ready removal.

In applying the wedge devices at the sides of a coaming in position for use, it is usual to affix them for driving in a direction from the bow toward the stern of the ship. The device with cooperating cleat as hereinbefore described can be applied for use on either the port or starboard side of a ship's hatch coaming as circumstances may require, it being necessary for such purpose merely to swing or turn the wedge plate upside down in relation to the cleat so as to enable it to be changed from a right hand device to a left hand device. To permit its appliance either way, the stud 4 is made of circular cross section so that it can swing around or over on its axis in the slot 5. The cleat is then affixed in proper angular relation to the coaming so that the wedge will operate against it in the manner indicated.

To limit the outward turning movement of the rearward portion 2 of the shoe, each end of the cleat 6 may be bevelled at 6ᵇ to form a stop for the said rearward portion of the shoe.

By the use of wedge devices constructed as described with slotted cleats as set forth, the wedge devices cannot become detached from the cleats and lost through rough seas or otherwise, so that the hatch covers will at all required times be securely fastened in the closed position. Also, as the rearward portion of each shoe is hinged to the forward portion thereof, the release of the wedges from the associated battens can be effected easily and quickly and with less risk than heretofore usual, of damaging the hatch cover.

For use with a railway wagon, each combined cleat 6 and wedge device 1, 2, 2ª, may, as shown, in Fig. 5, be fixed to an angle iron bar 10 secured to the body 11 of the wagon.

Instead of making the metal shoe in two parts as hereinbefore described, it may consist of a single metal plate as shown in Fig. 6.

What I claim is:—

1. A wedge device comprising a shoe-plate having a wedge-block at one side thereof, and means on its opposite side for attachment in slidable and swivel relation to a cooperating guide and support plate affixable in place and by which it is held.

2. A wedge device comprising a shoe made in two longitudinal portions jointed together to turn about a transverse axis, a wedge carried by one of said portions at one side thereof and means carried by the other portion of the shoe and arranged at the opposite side of the shoe to that at which the wedge is arranged, said means being adapted to admit of the shoe being movably attached to stationary guiding and supporting means.

3. A wedge device comprising a shoe made in two longitudinal portions jointed together transversely, a wedge connected to one side of one of said portions and a stud carried by the other portion and extending therefrom in an opposite direction to that in which the wedge extends.

4. A wedge device comprising in combination, a shoe-plate having a wedge-block provided at one side thereof, a cooperating support member therefor affixable in place and means connecting said shoe-plate in slidable and swivel relation with said member so as to limit the extent of its longitudinal movement in opposite directions and to permit it to be swung thereon before the latter is affixed in place.

5. In combination, a wedge device comprising a shoe made in two longitudinal portions jointed together transversely of their length, a wedge carried by and arranged at one side of one portion of said shoe, a guiding and supporting device against which said shoe can slide longitudinally, and means connecting the other portion of said shoe to said guiding and supporting device and adapted to admit of said shoe being moved longitudinally, to a limited extent, into operative and inoperative positions, the joint between the two portions of the shoe being so located that when the shoe is in its inoperative position, the portion thereof carrying the wedge can be turned in a direction opposite to that in which the wedge projects.

6. A wedge device comprising in combination, a shoe, a wedge-block carried by said shoe at one side, a cleat of angle section having a longitudinal slot in one face thereof against which said shoe is adapted to slide and bear wedgingly, a stud carried by said shoe and extending through said slot in the cleat for limiting its slide movement thereagainst, and means preventing the shoe becoming detached or said stud being withdrawn from the cleat.

7. In combination, a shoe made in two longitudinal portions jointed together transversely of their length, a wedge carried by and projecting from one side of one of said portions of the shoe, a cleat of angle section having therein a longitudinal slot closed at its ends and against one side of which said shoe is arranged to bear and slide, a stud connected to the second portion of said shoe and extending into the slot in the cleat and means adapted to prevent the shoe with stud becoming detached from said cleat, the joint between the two portions of shoe being so positioned that the portion carrying the wedge can, when said shoe is moved into its rearward and inoperative position, be turned outwardly relatively to the other portion of the shoe and the cleat.

8. A combined wedge device and cleat according to claim 7 wherein the cleat is adapted to limit the outward turning movement of the portion of the shoe carrying the wedge.

9. The combination with a structure open at its top and which is to be covered by a flexible cover, of a cleat of angle section connected to a side of said structure and having a vertical side portion inclined to the side of said structure, said vertical side portion having therein a longitudinal slot closed at its ends, a shoe comprising forward and rearward portions jointed together at their adjacent ends to turn about a vertical axis, and arranged to bear and slide longitudinally against the vertical side portion of said cleat, a wedge connected to the inner side of the rearward portion of said shoe, a stud connected to the forward portion of said slide and extending into the slot in said cleat and means adapted to prevent the forward portion of said shoe with stud becoming detached from said cleat.

Signed at London, England, this eleventh day of August, 1930.

EDGAR PERCY HAMLETT.